United States Patent
Murakami et al.

(10) Patent No.: US 6,812,634 B2
(45) Date of Patent: Nov. 2, 2004

(54) GRAPHITE NANOFIBERS, ELECTRON-EMITTING SOURCE AND METHOD FOR PREPARING THE SAME, DISPLAY ELEMENT EQUIPPED WITH THE ELECTRON-EMITTING SOURCE AS WELL AS LITHIUM ION SECONDARY BATTERY

(75) Inventors: Hirohiko Murakami, Ibaraki-ken (JP); Masaaki Hirakawa, Ibaraki-ken (JP); Chiaki Tanaka, Ibaraki-ken (JP)

(73) Assignee: Nihon Shinku Gijutsu Kabushiki Kaisha, Chigasaki (JP)

( * ) Notice: Subject to any disclaimer, the term of this patent is extended or adjusted under 35 U.S.C. 154(b) by 550 days.

(21) Appl. No.: 09/775,497

(22) Filed: Feb. 5, 2001

(65) Prior Publication Data

US 2002/0009637 A1 Jan. 24, 2002

(30) Foreign Application Priority Data

Feb. 4, 2000 (JP) .................................... 2000-028001
Feb. 4, 2000 (JP) .................................... 2000-028003
Jan. 12, 2001 (JP) .................................... 2001-004550

(51) Int. Cl.$^7$ ............................... H01J 1/62; H01J 9/00
(52) U.S. Cl. ..................... 313/495; 313/309; 445/49; 429/177
(58) Field of Search ................. 313/495, 309, 313/310, 351, 336, 311; 445/24, 25, 50, 51, 49; 429/177

(56) References Cited

U.S. PATENT DOCUMENTS 5,828,162 A * 10/1998 Danroc et al. .............. 313/309
6,471,936 B1 * 10/2002 Chen et al. .............. 423/658.2

* cited by examiner

Primary Examiner—Joseph Williams
(74) Attorney, Agent, or Firm—Arent Fox, PLLC

(57) ABSTRACT

A graphite nanofiber material herein provided has a cylindrical structure in which graphene sheets each having an ice-cream cone-like shape whose tip is cut off are put in layers through catalytic metal particles; or a structure in which small pieces of graphene sheets having a shape adapted for the facial shape of a catalytic metal particle are put on top of each other through the catalytic metal particles. The catalytic metal comprises Fe, Co or an alloy including at least one of these metals. The material can be used for producing an electron-emitting source, a display element, which is designed in such a manner that only a desired portion of a luminous body emits light, a negative electrode carbonaceous material for batteries and a lithium ion secondary battery. The electron-emitting source (a cold cathode ray source) has a high electron emission density and an ability of emitting electrons at a low electric field, which have never or less been attained by the carbon nanotube. The negative electrode carbonaceous material for batteries has a high quantity of doped lithium and ensures high charging and discharging efficiencies. Moreover, the lithium ion secondary battery has a sufficiently long cycle life, a fast charging ability and high charging and discharging capacities.

11 Claims, 4 Drawing Sheets

GRAPHITE NANOFIBERS, ELECTRON-EMITTING SOURCE AND METHOD FOR PREPARING THE SAME, DISPLAY ELEMENT EQUIPPED WITH THE ELECTRON-EMITTING SOURCE AS WELL AS LITHIUM ION SECONDARY BATTERY

BACKGROUND OF THE INVENTION

The present invention relates to graphite nanofibers, a source of electron emission and a method of the preparation thereof, a display element equipped with such an electron-emitting source as well as a lithium ion secondary battery. More specifically, the present invention pertains to graphite nanofibers, which may be applied to an electron-emitting source used in the field of display devices; an electron-emitting source provided with such graphite nanofibers; a method for preparing such an electron-emitting source according to the thermal chemical vapor deposition (thermal CVD) technique; a display element equipped with such an electron-emitting source; a carbonaceous material for negative electrodes of batteries, which consists of the graphite nanofibers; and a lithium ion secondary battery, which makes use of the carbonaceous material for negative electrodes as an active material for the negative electrode. The electron-emitting source can ensure a high quantity of emitted electrons and can be used not only in flat panels such as FED's, but also as an electron source for the conventional CRT's.

FIG. 1 shows the construction of a typical cold cathode ray source. The term "cold cathode ray source" means a cathode (or a negative electrode) serving as an electron-emitting source, which can emit electrons without application of any heat. In this case, a conical cathode chip (such as those comprising W, Mo, Si or the like) can be formed on an electrode substrate, for instance, by first applying a metal electrode substrate 2 (comprising, for instance, W, Mo or Si) onto a substrate 1, then forming a dielectric film serving as an electrical insulator 3 and a metal gate film (comprising, for instance, W, Mo and/or Si) serving as a gate electrode 4, on the electrode substrate 2, forming a resist film thereon, forming a hole pattern according to, for instance, a photo-lithography technique, and then removing the metal gate film and the dielectric film immediately below the holes through etching to thus expose the electrode substrate 2. Then a substance is obliquely deposited on the substrate while rotating the electrode substrate around a line, serving as a central line, vertical to the substrate to thus give a conical negative electrode chip 5. If Mo as an emitter material is, for instance, deposited on the electrode substrate, the direction of the Mo deposition is controlled in such a manner that Mo atoms may be deposited within the holes, while the Mo atoms gradually fill up the holes and thereafter, a release film is removed together with the excessive Mo film deposited on the substrate other than the holes to thus give an emitter. If the emitter prepared according to this method is used in the field of display, however, it can, at present, be operated only at an electric field on the order of 100 V/$\mu$m.

As has been discussed above, there have conventionally been investigated, for instance, Si and/or Mo as materials for cathodes (or negative electrodes), but there has recently been investigated the use of carbon nanotubes as such a cathode material. A carbon nanotube is a graphite fiber having a cylindrical shape formed from a helical structure mainly composed of carbon 6-membered rings and having a multiple structure in which a plurality of quite fine cylinders are concentrically arranged and either of the ends thereof is opened. The nanotube having such a structure is excellent in various characteristic properties such as electron emission characteristic properties, heat resistance and chemical stability as compared with those observed for other metallic materials. Such a nanotube has in general been produced according to a variety of methods such as an arc discharge technique, a laser evaporation technique and a plasma CVD technique. Among these, a method for preparing carbon nanotubes, which makes use of a microwave CVD technique, permits the growth of a carbon nanotube on a specific substrate perpendicularly to the substrate. The cold cathode ray source (electron-emitting source) has only a low quantity of electrons emitted at an applied voltage of 3 V/$\mu$m on the order of 1 mA/cm$^2$.

In addition, there has recently been required for the development of a battery having a high energy density in proportion to the miniaturization of electronic devices. For this reason, a high quality lithium ion secondary battery has been developed. For instance, there has been proposed a lithium ion secondary battery excellent in the cycle life and having a high discharge (service) capacity, which can be produced through the use of a carbonaceous material for the negative electrode such as the foregoing carbon nanotubes each having monolayered wall surface. This method makes the best use of the fact that an intercalation carbon compound of lithium can easily be formed electrochemically. More specifically, if charging a lithium ion secondary battery provided with a carbon negative electrode in a non-aqueous electrolyte, the lithium in the lithium-containing positive electrode is electrochemically doped between the carbon layers of the negative electrode, the lithium-doped carbon layer thus serves as a lithium electrode, the lithium is de-doped from the carbon layers as the discharge of the battery proceeds and as a result, it returns back to the positive electrode. In this respect, the charging rate (mAh/g) of the carbonaceous material per unit weight is determined by the amount of doped lithium and therefore, it is necessary to increase the degree of lithium-doping of the negative electrode as high as possible in order to ensure a high charging rate of the battery.

In the case of the electron-emitting sources comprising the conventional carbon nanotubes including those obtained by growing carbon nanotubes on a substrate perpendicularly thereto according to the foregoing methods, electrons are emitted from the carbon nanotubes through the tip or defective portions thereof. For this reason, any conventional carbon nanotubes cannot presently be used in the applications such as an electron source for CRT's, which require a high current density.

Moreover, in the case of the lithium ion secondary battery, which makes use of the foregoing carbon nanotubes as a negative electrode material, the carbon nanotube should have an open end or defective portions in order to ensure the intercalation of lithium ions into the nanotube. However, the conventional carbon nanotubes are not always sufficient in this respect. In other words, the conventional carbon nanotubes cannot permit the intercalation of lithium ions in a desired sufficient quantity or the amount of doped lithium cannot be increased to a desired level and therefore, the resulting electron-emitting source does not have any satisfactorily long cycle life and fast charging ability.

SUMMARY OF THE INVENTION

Accordingly, an object of the present invention is to solve the foregoing problems associated with the conventional techniques and more specifically to provide a negative electrode material ensuring a high electron emission density and an ability of emitting electrons at a low electric field, which have never or less been attained by the carbon nanotube; a carbon-based electron-emitting source comprising the negative electrode material and a method of the preparation thereof; a display element equipped with such an electron-emitting source; a negative electrode carbonaceous material for batteries having a high quantity of doped lithium and a lithium ion secondary battery, which makes use of the carbonaceous material as an active material for the negative electrode thereof and which thus has a sufficiently long cycle life, a fast charging ability and a high service capacity.

The inventors of this invention have conducted various studies to develop a negative electrode material, ensuring a high electron emission density and an ability of emitting electrons at a low electric field, and a carbonaceous material usable as an active material for the negative electrode of a lithium ion secondary battery, which makes use of the carbonaceous material as an active material for the negative electrode thereof and which thus has a sufficiently long cycle life, a fast charging ability and a high service capacity. The inventors have found that a graphite nanofiber whose structure has never been reported can be obtained during the growth of a crystal starting from a carbon-containing gas and hydrogen gas using the thermal CVD technique and that the graphite nanofiber possesses excellent electron emission characteristics and excellent quality as an active material for negative electrodes used in the lithium ion secondary battery and have thus completed the present invention on the basis of the foregoing findings.

According to an aspect of the present invention, there is provided a graphite nanofiber having a cylindrical structure in which graphene sheets each having an ice-cream cone-like shape whose tip is cut off are put in layers through catalytic metal pieces or particles; or a structure in which small pieces of graphene sheets having a shape adapted for the surface shape of a catalytic metal piece or particle are stacked on top of each other in layers through the catalytic metal particles. Among these, the graphite nanofiber having a cylindrical structure preferably has a through hole, which is vacant or filled with amorphous carbon, and has the diameter thereof preferably ranging from 10 nm to 600 nm. The graphite nanofiber having a diameter of less than 10 nm has not yet been prepared. On the other hand, those having a diameter of more than 600 nm are insufficient in the electron emission characteristics. It is preferred that the foregoing catalytic metal comprises Fe, Co or an alloy including at least one of these metals. The foregoing graphite nanofiber is effective as a negative electrode material having excellent electron emission characteristics such as a high electron emission density and an ability of emitting electrons at a low electric field.

According to a second aspect of the present invention, there is provided an electron-emitting source, which comprises a carbon layer formed on the surface of an electrode substrate or on the patterned surface portions of a patterned electrode substrate, wherein the carbon layer comprises the graphite nanofiber having the foregoing structure. In this respect, it is preferred that the electrode substrates on which the foregoing carbon layer is formed are those comprising Fe, Co or an alloy including at least one of these metals. These metals have a catalytic effect for forming a graphite nanofiber. An electron-emitting source provided with the graphite nanofiber would show excellent electron emission characteristics such as a high electron emission density and an ability of emitting electrons at a low electric field.

According to a third aspect of the present invention, there is provided a method for preparing an electron-emitting source, which comprises the step of growing a carbon layer on the surface of an electrode substrate or on the patterned surface portions of a patterned electrode substrate, at a layer-forming temperature, which does not exceed the heat resistant temperature of the electrode substrate comprising Fe, Co or an alloy including at least one of these metals, using a carbon-containing gas and hydrogen gas according to the thermal CVD technique to thus give a growth layer of graphite nanofibers having the foregoing structure. Those having such growth layer of the graphite nanofibers may serve as electron-emitting sources and may constitute cold negative electrode sources.

The electron-emitting source according to the present invention may likewise be prepared by collecting graphite nanofiber powders or particles having the foregoing structure, dispersing them in a solvent to form a paste and then applying the resulting paste onto an electrode substrate; or immersing an electrode substrate in a dispersion obtained by dispersing the foregoing powders or particles in a solution and then depositing or adhering the powders or particles, onto the substrate through the electro-depositing technique to give a desired electron-emitting source.

According to a fourth aspect of the present invention, there is provided a display element, which comprises a plurality of transparent conductive films having a desired pattern, an electron-emitting source formed by applying a carbon layer comprising graphite nanofibers having the foregoing structure on the patterned surface portions of a patterned electrode substrate, and a luminous body opposed to the carbon layer. As mentioned above, this display element is so designed that the carbon layer and the luminous body are arranged in such a manner that they are opposed to one another. For this reason, if arbitrarily selecting the carbon layer and the transparent conductive film and an electric voltage is applied thereto, electrons are emitted from the carbon layer and only a specific portion of the luminous body thus emits light.

According to a fifth aspect of the present invention, there is provided a negative electrode carbonaceous material for batteries, which consists of graphite nanofibers having the foregoing structure and which is doped with lithium in a high rate. The graphite nanofiber having a diameter of more than 600 nm never shows desired quality such as a high capacity. Such a graphite nanofiber has a fine structure approximately identical to that of the conventional carbon nanotube and accordingly, not only has characteristic properties such as those observed for active carbon having a high specific surface area, but also has a plurality of opened faces, which allows free passage of lithium ions therethrough. Therefore, the graphite nanofiber may serve as an excellent active material for negative electrodes having high charging and discharging capacities of more than the theoretical capacity of graphite (372 mAh/g).

According to a sixth aspect of the present invention, there is provided a lithium ion secondary battery, which comprises a positive electrode including, as an active material for positive electrode, a lithium transition metal oxide; a negative electrode including a carbonaceous material as a negative electrode active material; and an organic solvent-based electrolyte, wherein the carbonaceous material essentially consists of the graphite nanofibers having the foregoing structure. The use of such a carbonaceous material would permit the production of a lithium ion secondary battery having a long cycle life, a fast charging ability and a high service or discharge capacity.

BRIEF DESCRIPTION OF THE DRAWINGS

The present invention will hereunder be described in more detail with reference to the accompanying drawings, wherein.

DESCRIPTION OF THE PREFERRED EMBODIMENTS

The graphite nanofiber of the present invention has a cylindrical structure in which graphene sheets each having an ice-cream cone-like shape whose tip is cut off or having a truncated conical shape are put in layers or stacked on top of each other in layers through catalytic metal pieces or particles and each of which has a vacant through hole or a hole filled with amorphous carbon; or a structure in which small pieces of graphene sheets having a shape adapted for the surface shape of a catalytic metal piece or particle are stacked on top of each other in layers or put in layers through the catalytic metal particles. For instance, if the catalytic metal has a planar facial shape, the graphite nanofiber of the present invention has a structure in which small pieces of graphene sheets having a shape adapted for the surface shape of a catalytic metal are put on top of each other. Alternatively, if the catalytic metal has a facial shape, which makes an angle, the graphite nanofiber has a structure in which small pieces of graphene sheets having a plate-like shape making an angle and adapted for the surface shape of a catalytic metal are put on top of each other.

Such a graphite nanofiber can be prepared by the thermal CVD technique. For instance, a metal substrate comprising Fe, Co or an alloy including at least one of these metals is placed in a thermal CVD device equipped with an electric furnace, then evacuating the device, introducing, into the device, a carbon-containing gas such as carbon monoxide or carbon dioxide and hydrogen gas, and growing graphene sheets on the substrate at a pressure of usually 1 atm and a layer-forming temperature, which does not exceed the heat-resisting temperature of the metal substrate and is in general a temperature of not more than 1500° C., preferably 400 to 1000° C. to thus form a desired graphite nanofiber. The assembly thus obtained by depositing graphite nanofibers on a metal substrate may serve as an electron-emitting source.

The metal substrate has such a catalytic effect that a constituent metal of the substrate can promote the formation of the graphite nanofibers. If the layer-forming temperature is less than 400° C., the growth rate of the graphite nanofiber is extremely reduced, while if the layer-forming temperature exceeds 1500° C., the production process is industrially unfavorable from the viewpoint of a high cost required for heat energy or a high production cost. For instance, if the graphite nanofiber is used for making a display device, it is necessary to grow graphite nanofibers at a temperature, which does not exceed the heat-resisting temperature of a glass substrate.

Figure 1:
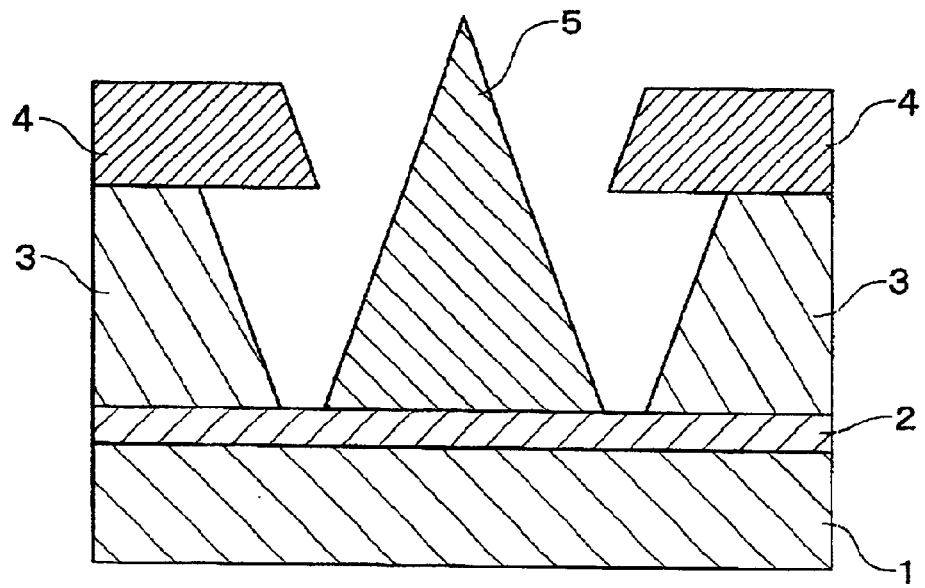
FIG. 1 is a cross sectional view schematically showing the structure of a typical cold cathode ray source of the conventional technique.
Figure 2:
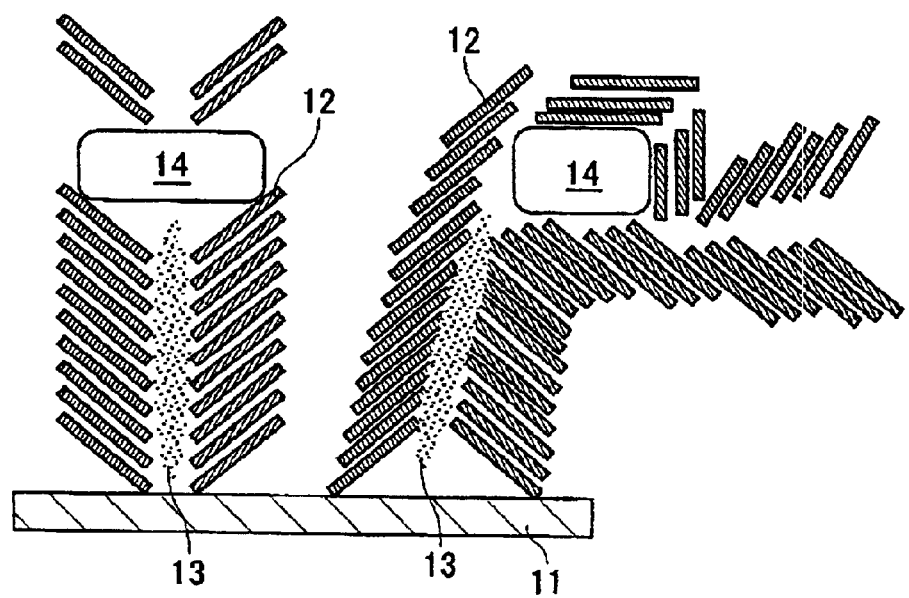
FIG. 2 is a cross sectional view schematically showing one of the structures of the graphite nanofibers according to the present invention.

As will be schematically shown in FIG. 2, each graphite nanofiber thus grown on a metal electrode substrate has such a laminated cylindrical structure that graphene sheets 12 having a truncated conical shape are grown, in a desired orientation, on the surface of a metal electrode substrate 11. The graphene sheets are grown, for instance, in such a manner that the edge of the tip (head) of the truncated cone is adhered to the surface of the metal electrode substrate or the edge of the bottom of the truncated cone is adhered to the surface of the metal electrode substrate. Moreover, the structure of each graphite nanofiber may comprise any combination of the foregoing adhered conditions. The graphite nanofiber thus laminated on the surface of the metal electrode substrate has a through hole 13 at the center thereof and the through hole is vacant or filled with amorphous carbon. Moreover, the graphene sheets grow and are laminated with one another while partially embedding, between the graphene sheets, particles 14 of the metal substrate formed during the production steps.

Figure 3:
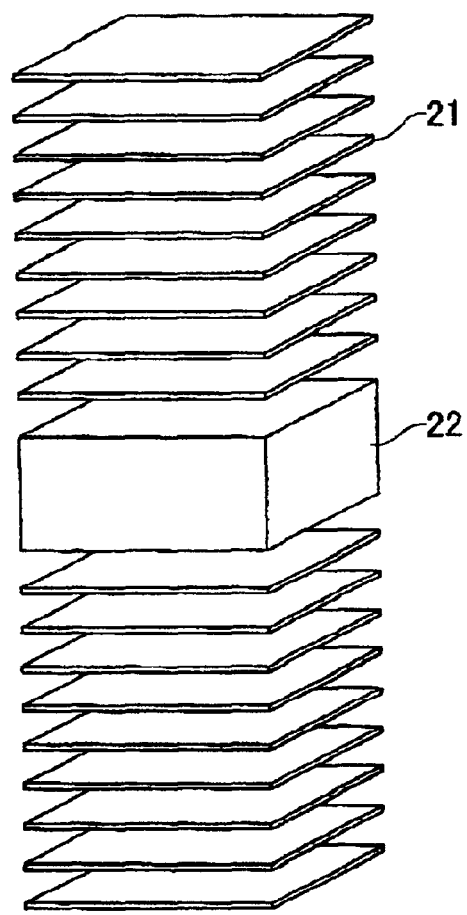
FIG. 3 is a cross sectional view schematically showing another structure of the graphite nanofibers according to the present invention.
Figure 4:
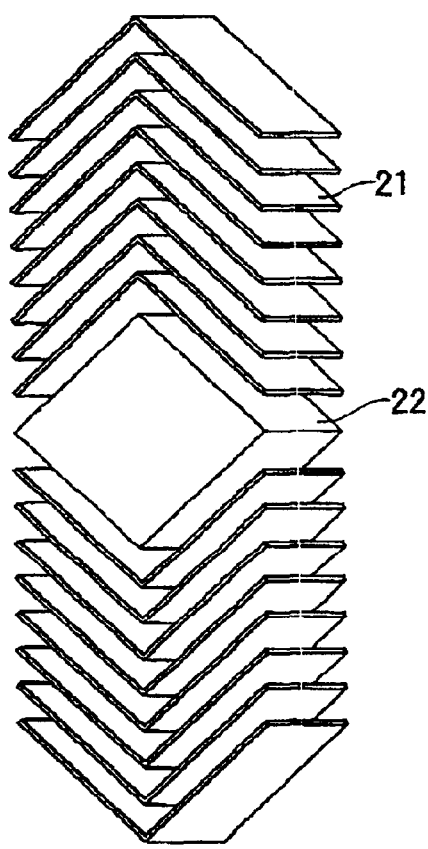
FIG. 4 is a cross sectional view schematically showing still another structure of the graphite nanofibers according to the present invention.

Each graphite nanofiber may have a structure other than that shown in FIG. 2, such as those schematically depicted on FIGS. 3 and 4. More specifically, if the catalytic metal 22 originated from the metal substrate has a planar facial shape as shown in FIG. 3, a plurality of small pieces of graphene sheets 21 having a planar shape adapted for the surface shape of the catalytic metal are put on top of each other, on the surface of each catalytic metal particle. Moreover, if the catalytic metal 22 originated from the metal electrode substrate has a facial shape, which makes an angle, as shown in FIG. 4, a plurality of small pieces of graphene sheets 21 having a plate-like shape, which makes an angle, adapted for the surface shape of the catalytic metal are put on top of each other, on the surface of each catalytic metal particle 22.

The graphite nanofiber according to the present invention comprises a mixture of those having structures as shown in FIGS. 2, 3 and 4.

Figure 5:
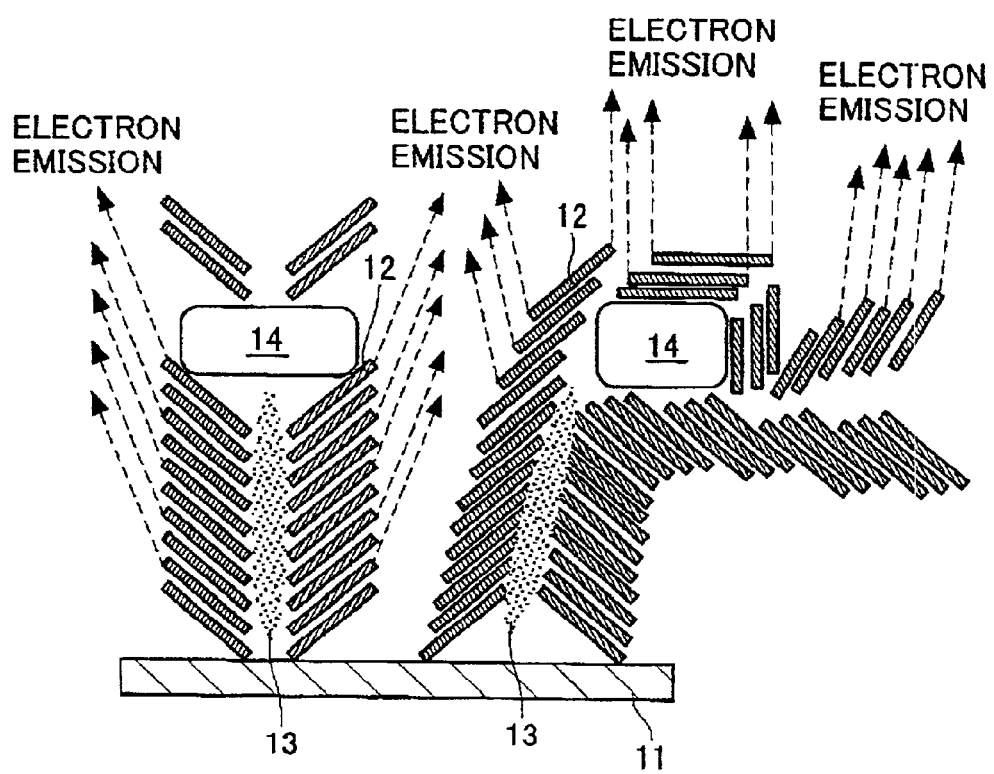
FIG. 5 is a schematic diagram for explaining the electron emission through the graphite nanofiber according to the present invention.
Figure 7:
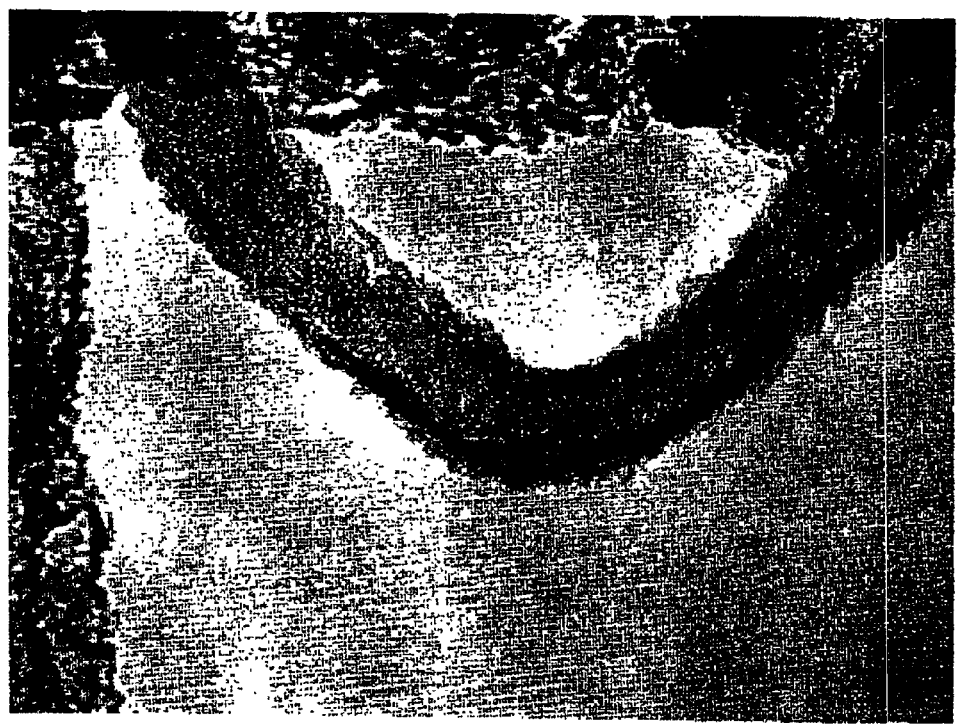
FIG. 7 is a transmission electron micrograph (TEM) of the graphite nanofiber according to the present invention.

If a layer of the foregoing graphite nanofiber is formed on a metal electrode substrate, the resulting carbon-based electron-emitting source equipped with such graphite nanofibers may substantially be improved in the field electron emission characteristics. Specifically, electrons may be emitted at a higher current density upon application of a voltage identical to that used in the conventional carbon nanotubes and accordingly, the carbon-based electron-emitting source can certainly be used as an electron source for CRT's. An electron emission model or mechanism will now be described below while taking the graphite nanofiber having the structure shown in FIG. 2 as a typical example. As will be clear from FIG. 5, which schematically shows the electron emission through such a graphite nanofiber, the field electron emission would be assumed to take place at the edge of each graphite nanofiber or at the end of each graphene sheet 12. The reference numerals appearing on FIG. 5 are identical to those shown in FIG. 2. In the case of the graphite nanofibers shown in FIGS. 3 and 4, electrons are emitted according to the same mechanism as described above.

The carbon layer used for making an electron-emitting source in the present invention is formed on the surface of an electrode substrate, but may likewise be formed on the patterned surface portions of a patterned electrode substrate. In the latter case, a desired pattern can be formed on the surface of an electrode substrate, for instance, by the known photolithography technique, which comprises the step of applying a solution of a light-sensitive resin onto the surface of the electrode substrate, or by any known printing process to thus give an electrode substrate provided thereon with such a desired pattern, followed by the growth of graphite nanofibers on the specific patterned portion to obtain a carbon layer having a desired pattern, which may be used as an electron-emitting source.

Alternatively, graphite nanofiber powder or particles can be obtained by removing the growth layers of graphite nanofibers formed on an electrode substrate and recovering the same. According to the present invention, the powder is dispersed in a conductive paste such as silver paste to prepare a paste, followed by applying the paste onto an electrode substrate and then drying the applied paste layer to adhere the graphite nanofibers to desired positions on the electrode substrate. Alternatively, the powder may be dispersed in a known electrically conductive solvent to give a dispersion, followed by immersing an electrode substrate in the dispersion to thus adhere the graphite nanofibers to desired positions on the electrode substrate according to the electro-deposition technique. The electron emission source or a cold cathode ray source can thus be obtained according to the present invention. As has been discussed above, if the graphite nanofibers of the present invention are converted into powder or particles, an electron emission source (cold cathode ray source) having a desired pattern arbitrarily selected depending on each particular purpose can easily be prepared according to the present invention, e.g. by the printing technique or electro-deposition technique as mentioned above.

The present invention also relates to a display element, which is provided with the foregoing electron emission source comprising a carbon layer having a desired pattern. Therefore, if a luminous body is formed on a transparent conductive film having a desired pattern, the display element can be designed in such a manner that only a specific portion of the luminous body can emit light.

Then we will explain the carbonaceous negative electrode material for batteries and the lithium ion secondary battery according to the present invention, in more detail below.

The carbonaceous negative electrode material for batteries and the lithium ion secondary battery according to the present invention have been developed on the basis of such a finding that lithium ions can freely pass through the graphite nanofibers having the structure described above.

The carbonaceous material or the graphite nanofiber can be prepared by the methods discussed above. The graphite nanofibers usable herein as a negative electrode active material for batteries are obtained by removing the growth layers of the graphite nanofibers prepared according to the foregoing method and then recovering them. A negative electrode (carbon electrode) can be prepared using this active material by kneading the graphite nanofibers and a binder (such as a resin such as polyvinylidene fluoride, which is commonly used in the preparation of an electrode) in a solvent such as dimethyl formamide to give a negative electrode mixture. Then the mixture is formed into a paste together with nickel meshes to thus form a negative electrode.

The positive electrode material usable herein is not restricted to any specific one inasmuch as the material comprises a sufficient amount of lithium, but a particularly excellent result can be attained when a lithium transition metal oxide is used as such a material. Examples of transition metals preferably used herein are at least one member selected from, for instance, cobalt and nickel.

The foregoing organic solvent-based electrolyte is not likewise restricted to any specific one inasmuch as it is commonly used as an electrolyte for a lithium ion secondary battery.

Figure 6:
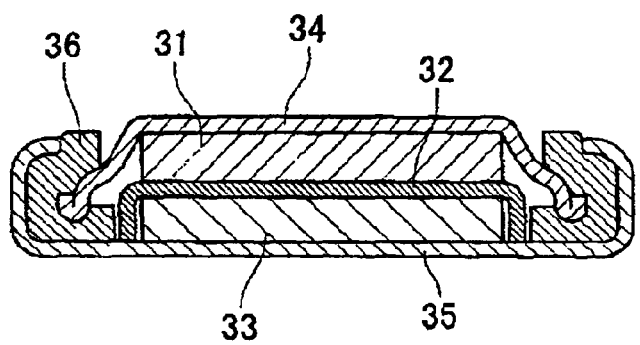
FIG. 6 is a side cross sectional view of a lithium ion secondary battery provided with the graphite nanofibers according to the present invention as a negative electrode active material.

An embodiment of the lithium ion secondary battery according to the present invention is a coin-like one, which is prepared using the carbonaceous material of the present invention as the negative electrode active material and whose cross sectional view is shown in FIG. 6. The structure thereof is identical to that of the known coin-like battery and can thus be produced according to the conventional method. More specifically, this secondary battery can be produced by forming a disk-like negative electrode 31 using a negative electrode mixture prepared by kneading the foregoing graphite nanofibers along with desired additives, putting a disc-like positive electrode 33 on top of the negative electrode 31 through a separator 32 and then sealing the electrode assembly by sandwiching it between a negative electrode collector 34 and a positive electrode collector 35, each collector being composed of nickel or the like, while electrically insulating these collectors with a gasket 36.

The present invention will now be described in more detail with reference to the following examples, but the present invention is not restricted to these specific Examples at all.

EXAMPLE 1

An iron substrate was placed in a known thermal CVD device and the device was evacuated to a vacuum on the order of 1 Pa. Thereafter, a mixed gas of hydrogen gas and carbon monoxide gas was introduced into the device at 1 atm so that the gas mixture flew through the device, while the temperature of the substrate was raised up to 650° C. using an electric furnace to thus react the gas mixture at this temperature for 30 minutes. As a result, a graphene sheet grew on the iron substrate. In this respect, the concentration of the carbon monoxide gas was adjusted to a level of 30% by volume during the reaction. The substrate provided thereon with a carbon layer was removed from the thermal CVD device, then the resulting sample was inspected for the Raman scattering spectra and as a result, it was confirmed that the resulting layer comprised graphite because of the presence of spectra peculiar to graphite. In addition, the sample was observed with a scanning electron microscope (SEM) and it was found that a plurality of graphite nanofibers grew on the iron substrate in a curled condition. Moreover, the graphite nanofiber was also observed with a transmission electron microscope (TEM) and it was found that each graphite nanofiber had a cylindrical structure in which graphene sheets having ice-cream cone-like shape whose tip was cut off (or having a truncated conical shape) were put on top of each other through metal catalyst particles, as shown in FIG. 2; a structure as shown in FIG. 3 in which a plurality of small pieces of graphene sheets 21 having a planar shape adapted for the surface shape of the catalytic metal 22 originated from the metal electrode substrate were put on top of each other, on the surface of each catalytic metal particle; or a structure as shown in FIG. 4 in which, if the catalytic metal 22 originated from the metal electrode substrate has a facial shape, which makes an angle, a plurality of small pieces of graphene sheets 21 having a plate-like shape, which was curved at an angle and adapted for the facial shape of the catalytic metal 22 were put on top of each other, on the surface of each catalytic metal particle 22. Moreover, it was also found that the resulting sample comprised a combination of these structures. Moreover, it was also confirmed that the graphite nanofiber having the structure as shown in FIG. 2 had a through hole at the center thereof, the through hole was vacant or filled with amorphous carbon and that the graphite nanofibers had the structure in which particles of the metal substrate originated from the electrode substrate were partially embedded or intercalated between the graphene sheets to thus form cylindrical structure. The diameter of the resulting graphite nanofiber was found to fall within the range of from 10 nm to 600 nm.

Then the electron-emitting source consisting essentially of the graphite nanofiber layer thus prepared was inspected for the characteristic properties. As a result, it was found that the electron emission was initiated at an instance when the applied voltage reached 0.8 V/$\mu$m, then the quantity of electrons emitted increased as the applied voltage was increased and it reached 100 mA/cm$^2$ at an applied voltage of 5 V/$\mu$m. In an needle-like electron-emitting source, which made use of the carbon nanotubes prepared according to the conventional technique, the quantity of electrons emitted was found to be 1 mA/cm$^2$ at an applied voltage of 3 V/$\mu$m. Thus, the electron-emitting source according to the present invention permitted the electron emission at a higher rate even at a very low applied voltage as compared with that achieved by the conventional electron-emitting source.

EXAMPLE 2

An Inconel (Ni—Cr—Fe alloy) substrate was placed in the same thermal CVD device as that used in Example 1 and the device was evacuated to a vacuum on the order of 1 Pa. Thereafter, a mixed gas of hydrogen gas and carbon dioxide gas was introduced into the device at 1 atm so that the gas mixture flew through the device, while the temperature of the substrate was raised up to 650° C. using an electric furnace to thus react the gas mixture at this temperature for 30 minutes. As a result, a graphene sheet grew on the alloy substrate. In this respect, the concentration of the carbon dioxide gas was adjusted to a level of 30% by volume during the reaction. The substrate provided thereon with a carbon layer was removed from the thermal CVD device and then the resulting sample was inspected for various characteristic properties. As a result, it was found that graphite nanofibers grew on the substrate in a curled condition like the nanofiber obtained in Example 1 and that the resulting graphite nanofiber likewise comprised a mixture of those having different structures identical to those observed in Example 1.

The electron-emitting source consisting essentially of the graphite nanofiber layer thus prepared was inspected for various characteristic properties and it was found that the source could attain a quantity of emitted electrons approximately identical to that observed for the source produced in Example 1.

EXAMPLE 3

An SUS 304 substrate was placed in the same thermal CVD device as that used in Example 1 and the device was evacuated to a vacuum on the order of 1 Pa. Thereafter, a mixed gas of hydrogen gas and carbon monoxide gas was introduced into the device at 1 atm so that the gas mixture flew through the device, while the temperature of the substrate was raised up to 650° C. using an electric furnace to thus react the gas mixture at this temperature for 60 minutes. As a result, a graphene sheet grew on the substrate. In this respect, the concentration of the carbon monoxide gas was adjusted to a level of 30% by volume during the reaction. The substrate provided thereon with a carbon layer was removed from the thermal CVD device and then the resulting sample was inspected for various characteristic properties. As a result, it was found that graphite nanofibers grew on the substrate in a curled condition like the nanofiber obtained in Example 1 and that the resulting graphite nanofiber likewise comprised a mixture of those having different structures identical to those observed in Example 1.

Then the resulting graphite nanofibers were collected, followed by mixing the powdery nanofibers with a commercially available silver paste for distributing wires (available from NICORA Company) to thus give a paste of nanofibers, application of the paste onto a glass substrate according to the printing technique and then drying the same to give an electron-emitting source.

The electron-emitting source consisting essentially of the coated film of the graphite nanofibers thus prepared was inspected for various characteristic properties and it was found that the source could attain a quantity of emitted electrons approximately identical to that observed for the source produced in Example 1.

EXAMPLE 4

The graphite nanofibers prepared in Example 1 were collected and mixed and kneaded with polyvinylidene fluoride (binder) in a solvent (dimethyl formamide) to give a negative electrode mixture. Then the negative electrode mixture was formed into a pellet together with nickel meshes to form a carbon electrode (negative electrode). This negative electrode was fitted to the usual battery for test and the resulting battery was inspected for the charging capacity and the service (discharge) capacity. The structure of the test battery (coin-like battery) is as follows:

Counter electrode: lithium metal;

Separator: porous polypropylene film;

Electrolyte: prepared by dissolving lithium perchlorate, a an electrolyte, in 1:1 (v/v) mixed solvent of ethylene carbonate and dimethyl carbonate in a concentration of 1 mole/L;

Dimension of the battery: 20 mm (diameter)×2.5 mm (thickness).

The foregoing test battery was subjected to repeated charge-discharge cycles at a constant current of 500 $\mu$A (current density: 0.26 mA/cm$^2$). The end points of the charging and discharging were defined to be 0 V and 1.5 V, respectively, as expressed in terms of the battery voltage. The capacities of the resulting graphite nanofiber negative electrode were found to be 980 mAh/g for the charging capacity and 930 mAh/g for the discharging capacity. The results thus obtained clearly indicate that the graphite nanofiber electrode ensures a discharging capacity substantially higher than the theoretical capacity for the graphite electrode on the order of 371 mAh/g and that the graphite nanofiber electrode also shows excellent charging and discharging efficiencies ((discharging capacity/charging capacity)×100).

EXAMPLE 5

The graphite nanofibers prepared in Example 2 were collected and a negative electrode was prepared by repeating the same procedures used in Example 4 to evaluate the charging capacity and the discharging capacity thereof. As a result, it was found that the resulting negative electrode showed discharging capacity and charging and discharging efficiencies which were approximately identical to those observed for the graphite nanofiber electrode prepared in Example 4.

EXAMPLE 6

The graphite nanofibers prepared in Example 3 were collected and a negative electrode was prepared by repeating the same procedures used in Example 4 to evaluate the charging capacity and the discharging capacity thereof. As a result, it was found that the resulting negative electrode showed discharging capacity and charging and discharging efficiencies which were approximately identical to those observed for the graphite nanofiber electrode prepared in Example 4.

EXAMPLE 7

Figure 8A:
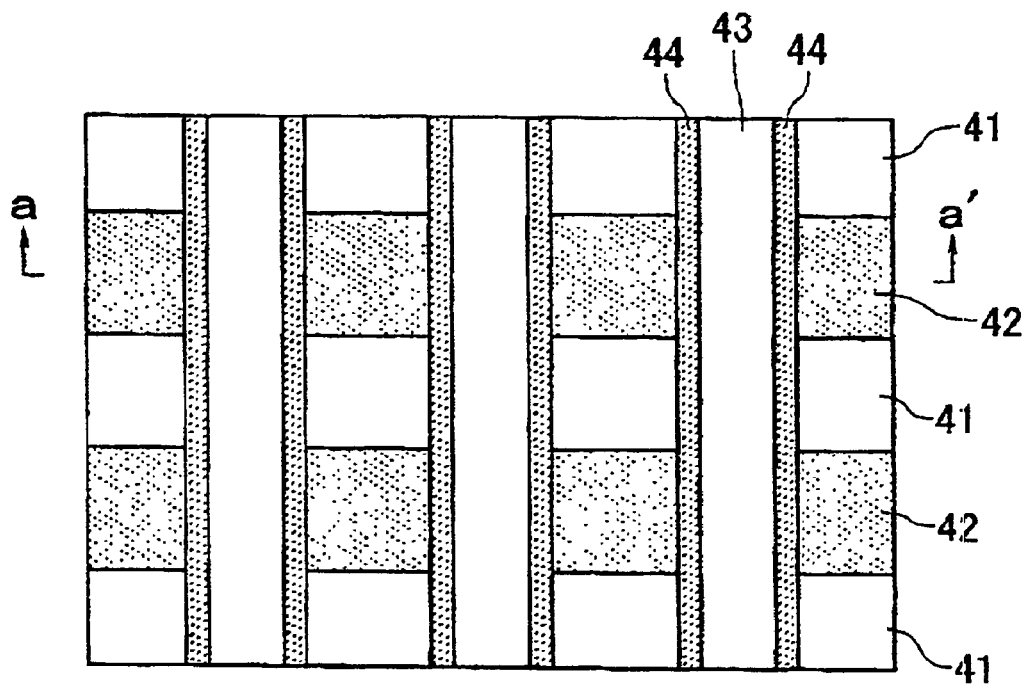
FIG. 8(A) is a plan view of a substrate with gate electrodes formed thereon and FIG. 8(B) is a cross sectional view of the substrate shown in FIG. 8(A), cut by a line a—a'.
Figure 8B:
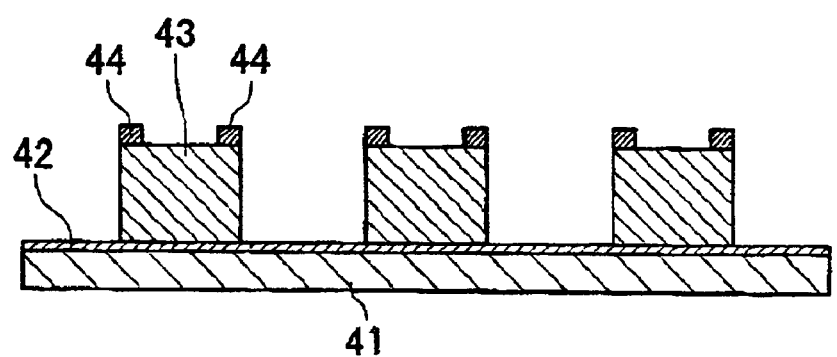

As shown in FIGS. 8(A) and (B), an Fe film is formed on a glass substrate 41 according to the sputtering technique, followed by forming lines 42 of the Fe film using the photolithography technique and forming gate electrodes 44, which were formed perpendicularly to the substrate, on the Fe lines through glass ribs 43. The substrate provided with the gate electrodes thus formed was placed in the same thermal CVD device as that used in Example 1 and the device was evacuated to a vacuum on the order of 1 Pa. Thereafter, a mixed gas of hydrogen gas and carbon dioxide gas was introduced into the device at 1 atm so that the gas mixture flew through the device, while the temperature of the substrate was raised up to 650° C. using an electric furnace to thus react the gas mixture at this temperature for 60 minutes. As a result, a graphite nanofiber grew on the Fe lines 42 formed on the surface of the substrate.

The cathode substrate provided with the graphite nanofiber thus grew was kept to be parallel with an anode substrate provided with lines of fluorescent body and the both substrates were attracted or adhered to each other while evacuating a space between the substrates to a vacuum on the order of $10^{-7}$ Torr.

An electric field of 100 V/$\mu$m was applied to the gate electrode while applying a voltage of several kV to the anode. As a result, it was confirmed that the electrons were emitted from any dots.

As has been described above in detail, the present invention herein provides graphite nanofibers having a specific structure. The graphite nanofiber permits the production of a carbon-based electron-emitting source (a cold cathode ray source) having a high electron emission density and an ability of emitting electrons at a low electric field, which have never or less been attained by the carbon nanotube. The graphite nanofiber of the present invention also permits the production of a display element equipped with a carbon-based electron-emitting source, which can emit light at a desired position on the luminous body thereof.

The present invention also permits the production of a negative electrode carbonaceous material for batteries having a high quantity of doped lithium and ensuring high charging and discharging efficiencies while making use of the foregoing graphite nanofibers. Moreover, it is also possible to provide a lithium ion secondary battery, which makes use of the carbonaceous material as an active material for the negative electrode thereof and which thus has a sufficiently long cycle life, a fast charging ability and high charging and discharging capacities.

What is claimed is:

1. A graphite nanofiber having a cylindrical structure in which graphene sheets each having an ice-cream cone-like shape whose tip is cut off are put in layers through catalytic metal particles that are partially embedded between the graphene sheets; or a structure in which small pieces of graphene sheets having a shape adapted for a surface shape of a catalytic metal particle are put on top of each other in layers through said catalytic metal particles that are partially embedded between the graphene sheets.

2. The graphite nanofiber as set forth in claim 1, wherein said graphite nanofiber having a cylindrical structure has a through hole, which is vacant or filled with amorphous carbon and a diameter thereof ranges from 10 nm to 600 nm.

3. The graphite nanofiber as set forth in claim 1, wherein a constituent metal of said catalytic metal particles comprises Fe, Co or an alloy including at least one of these metals.

4. The graphite nanofiber as set forth in claim 2, wherein a constituent metal of said catalytic metal particles comprises Fe, Co or an alloy including at least one of these metals.

5. An electron-emitting source, which comprises a carbon layer deposited on a surface of an electrode substrate or on patterned surface portions of an electrode substrate, wherein said carbon layer comprises graphite nanofibers as set forth in any of claims 1 to 4.

6. The electron-emitting source as set forth in claim 5, wherein said electrode substrate on which said carbon layer is formed comprises Fe, Co or an alloy including at least one of these metals.

7. A method for preparing an electron-emitting source, comprising the step of:

growing a graphene sheet on a surface of an electrode substrate or on patterned surface portions of a patterned electrode substrate, which comprises Fe, Co or an alloy including at least one of these metals, using a carbon-containing gas and hydrogen gas according to a thermal CVD technique to thus give a growth layer of graphite nanofibers as set forth in any of claims 1 to 4.

8. A method for preparing an electron-emitting source, comprising the steps of:

preparing a paste by dispersing graphite nanofiber powder as set forth in any of claims 1 to 4 in a solvent; and then applying said paste onto a surface of an electrode substrate; or preparing a dispersion by dispersing said powder in a solvent;

immersing an electrode substrate in said dispersion; and depositing said graphite nanofibers on said electrode substrate by electro-deposition.

9. A display element, comprising a plurality of transparent conductive films having a desired pattern, an electron-emitting source formed by applying a carbon layer comprising graphite nanofibers as set forth in any of claims 1 to 4 on patterned surface portions of a patterned electrode substrate and a luminous body opposed to said carbon layer, wherein said element is so designed that if selecting said carbon layer and said transparent conductive film and applying an electric voltage thereto, electrons are emitted from said carbon layer so that only a specific portion on said luminous body emits light.

10. A negative electrode carbonaceous material for batteries essentially consisting of graphite nanofibers as set forth in any of claims 1 to 4.

11. A lithium ion secondary battery, comprising: a positive electrode, which includes, as an active material for positive electrode, a lithium transition metal oxide;

a negative electrode, which includes a carbonaceous material as a negative electrode active material; and an organic solvent-based electrolyte, and wherein said carbonaceous material essentially consists of said graphite nanofibers as set forth in any of claims 1 to 4.

\* \* \* \* \*